United States Patent [19]

Hollis

[11] 4,339,377
[45] Jul. 13, 1982

[54] METHOD OF POLYMERIZING ROSIN
[75] Inventor: Samuel D. Hollis, Savannah, Ga.
[73] Assignee: Union Camp Corporation, Wayne, N.J.
[21] Appl. No.: 300,164
[22] Filed: Sep. 8, 1981
[51] Int. Cl.³ .......................... C09F 1/04; B01J 31/02
[52] U.S. Cl. .................................. 260/99.5; 252/426; 260/97; 260/97.5; 260/106
[58] Field of Search ................ 260/97, 97.5, 99.5, 260/106; 252/426

[56] References Cited

U.S. PATENT DOCUMENTS

| | | | |
|---|---|---|---|
| 1,980,367 | 11/1934 | Auer | 260/99.5 |
| 2,327,165 | 8/1943 | Borglin | 260/99.5 |
| 2,419,185 | 4/1947 | Braidwood et al. | 260/99.5 |
| 3,842,019 | 10/1974 | Kropp | 252/426 |
| 3,891,612 | 6/1975 | Parkin et al. | 260/99.5 |
| 3,984,357 | 10/1976 | Koshar | 252/426 |

OTHER PUBLICATIONS

Parkin, Ind. Eng. Chem. Prod. Res. Dev., vol. 11, No. 2 (1972), pp. 156–158.

Primary Examiner—H. S. Cockeram
Attorney, Agent, or Firm—Kane, Dalsimer, Kane, Sullivan and Kurucz

[57] ABSTRACT

Compounds of the formula:

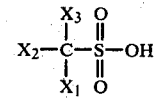

wherein $X_1$, $X_2$ and $X_3$ are each selected from the group consisting of hydrogen and halogen are disclosed as catalysts for polymerizing rosin.

13 Claims, No Drawings

METHOD OF POLYMERIZING ROSIN

BACKGROUND OF THE INVENTION

1. Field of the Invention

The invention relates to methods of polymerizing rosin.

2. Brief Description of the Prior Art

The term "polymerized rosin" refers to the resinous mixture obtained when rosin is treated under various conditions with strong inorganic acids or acidic clays. The mixture comprises non-reactable rosin acids such as dehydroabietic acid, rosin acids containing some unsaturation which did not react and a number of different types of polymerized rosin acids including dimerized rosin acids. The mixture also contains a minor amount of esters, rosin anhydrides and non-saponifiable substances. Polymerized rosin may be refined, usually by distillation, to remove some portion of the monomeric rosin acids and other substances to produce a mixture containing a higher concentration of polymerized rosin acid. This refined mixture always has a higher softening point than unrefined polymerized rosin and it is referred to as "dimerized rosin" in many textbooks.

There are many references in the chemical literature which describe the utility of polymerized rosin. The "Encyclopedia of Chemical Technology", 2nd edition, Vol. 17 p.497–498, the "Encyclopedia of Polymer Science and Technology", Vol. 12, p. 139–161 and the U.S. patents of Rummelsburg (U.S. Pat. Nos. 2,136,525 and 2,108,928) describe the numerous and varied applications for polymerized rosin. It is pertinent to note that all of the applications for this valuable substance may be divided into two categories; those in which it is reacted chemically such as in alkyds, polyesters or resinates and those in which it is used by means of physical admixture such as in a solvent born mixture with elastomers to prepare pressure sensitive adhesives, in hot melt adhesives where it is also used in combination with high polymers as a molten blend and in solvent born mixtures with high molecular weight coating polymers such as nitrocellulose. Dimerized rosin may be regarded as a high quality polymerized rosin which will usually exhibit improved properties advantageous in almost all of the chemical and physical blend uses. An improved physical property common to all polymerized rosin (which is usually a major reason for its utility in physical blends) is the higher degree of resistance of polymerized rosin to crystallize from solvent solution or from the molten state. In their paper, "The Relationship of Dimer Content of Rosin Determined by Gas Chromatography to Crystallization Time", Leonard et al, (Journal of The American Chemical Society, Vol. 42, p. 111 to 113, 1965) observed that this property can be treated quantitatively, and that in general, the higher the dimer rosin content, the greater the resistance of the polymerized rosin to crystallization. This was confirmed by Sinclair and Schuller et al, reporting in "Influence of Reaction Conditions on the Dimerization of Abietic Acid and Rosin", Ind. Eng. Chem. Prod. Res. Develop., Vol. 9, No. 1, March 1970. Their data provides an excellent reference for the analysis of polymerized rosin and a criteria for assessing the efficiency of any polymerization process. That criteria is simply the content of dimer rosin developed in a single treatment. However, dimer content alone does not entirely account for the degree of crystallization resistance seen in a given mixture of polymerized rosin.

Tall oil rosin is one of the most available of all rosin types but it also has the greatest tendency to crystallize as shown by Leonard et al. Supra. Any process which is used to polymerize rosin could theoretically be used as a partial or full treatment to decrease the tendency of tall oil rosin to crystallize and thus give it greater utility. Unfortunately, none of the processes known until now are very convenient. Much prior art exists that bears upon the conversion of rosin, including tall oil rosin, to a more polymeric substance. The patents of Rummelsburg mentioned above in addition to his more recent U.S. Pat. Nos. 2,307,641 and 2,328,681 are examples, also the patent of Hampton U.S. Pat. No. 2,515,218. Also representative of the prior art are U.S. Pat. Nos. 2,251,806; 2,532,120; and 4,105,462.

In spite of the many methods which have been described for polymerizing rosin, there are at least two disadvantages which usually attend all processes for polymerizing rosin. First, the nature of the acid catalyst is a disadvantage, ie; its acidity makes it difficult to handle. All of the catalysts known to be operable within a reasonable process time to obtain acceptable yields of dimer suffer from some combinations of the following disadvantages. They are corrosive; they evolve corrosive or poisonous fumes; their salts are toxic; they need be used at high levels; they leave residuals (often chemically bonded contaminants) in the final product; they require processing of rosin at relatively low temperatures; and they require processing of rosin in the presence of large amounts of inert solvent. In regard to the latter two points, rosin when used in production quantities is usually stored in the molten condition at temperatures around 150° C. To dissolve it in solvents for processing at 30° to 60° C. requires considerable cooling (a time consuming step). The rosin may crystallize in the process and all the solvent must be stripped out later (which results in low kettle yields). The second major disadvantage of prior art processes, particularly those which use sulfuric acid, is the separation of an acidic sludge or emulsion during work-up. Tall oil rosin polymerization is especially prone to develop a large acid sludge layer which can be very troublesome. The problem is mentioned specifically by Sinclair et al in U.S. Pat. No. 3,663,545.

the present invention is an improvement over the prior art in that it permits one to attain the highest content of polymerized rosin possible in a fast, single step using a convenient manufacturing sequence. The product, having a high dimer acid content, resists crystallization for moderate periods of time without a need for further refining to remove monomer acids and other materials which may promote crystallization.

The product polymerized rosin also has a color which is generally no darker than I (Rosin Cube) and has a softening point equal to or greater than the starting rosin material.

A substantial advantage of the method of the invention resides in the class of acid catalyst used to promote the polymerization. This class of acids avoid practically all of the disadvantages of other previously known strong acid catalysts. They are homogeneous catalysts which dimerize even tall oil rosin without the formation of acid sludge. They operate at higher temperatures (in the range of 60° to 180° C. but preferably in the range of 90° C. to 150° C.), they can be used at levels as low as 0.01% of acid based on rosin (a level of 0.3% to 1.0% is preferred) but even a level of 3.0% or more can be used in a fast, low temperature process. It is surprising that water does not deactivate these catalysts. This is advantageous and it is a part of the invention that they may be supplied to the reaction as a solution of 50% or more in water. This is fortunate because these catalysts are much more convenient to synthesize in water solution than they are in the anhydrous state. These and other advantages will be described more fully hereinafter.

SUMMARY OF THE INVENTION

The invention comprises the polymerization of a rosin in the presence of a catalytic proportion of a compound selected from those of the formula:

wherein $X_1$, $X_2$, and $X_3$ are each selected from the group consisting of hydrogen and halogen; and at a temperature of from about 60° C. to about 180° C.

The term "halogen" is used herein in its commonly accepted sense as being embracive of chlorine, bromine, iodine and fluorine.

The method of the invention produces improved yields of product, polymerized rosin.

DETAILED DESCRIPTION OF THE INVENTION

The method of the invention is based on the discovery that methanesulfonic acid and its halogenated derivatives are effective catalysts for promoting the polymerization of rosin. These catalysts are represented in the formula (I) given above. Their activity in promoting the polymerization of rosin, listed in approximate increasing order of activity, proceeds from methanesulfonic acid (least reactive) through all of its partially halogenated and fully halogenated derivatives to trifluoromethanesulfonic acid (most reactive).

The compounds of formula (I) are well known compounds as is the method of their preparation. Representative of the compounds of formula (I) are methanesulfonic acid, chloromethanesulfonic acid, trichloromethanesulfonic acid, tribromomethanesulfonic acid and the like.

Rosins which are advantageously polymerized by the method of the invention are represented by tall oil rosin, wood rosin and gum rosin.

Polymerization of the rosins are carried out by heating the rosin to a temperature of from about 60° C. to about 180° C., preferably 90° C. to 150° C., in the presence of a catalytic proportion of a compound of the formula (I) given above.

A catalytic proportion of the compound of formula (I) is one which promotes the desired polymerization. In general, a catalytic proportion will be one within the range of from about 0.01 percent to about 10 percent or more by weight of the rosin. Higher proportions are not generally required and only add to the expense of the process. Preferably, one employs from about 0.3 percent to 1 percent catalyst by weight of rosin. Higher proportions tend to speed the polymerization reaction.

The catalyst of formula (I) may be added to the rosin for polymerization in anhydrous form or in water solution as previously described.

The polymerization may be carried out neat or in the presence of a solvent for the rosin. A wide variety of solvents may be employed. One class of solvents which may be employed are inert solvents, ie; solvents which do not enter into or otherwise adversely affect the desired course of the polymerization. Representative of inert solvents are the hydrocarbon solvents.

Representative of hydrocarbon solvents which may be employed are benzene, xylene, mineral spirits, cyclohexane and the like; halogenated hydrocarbons such as carbon tetrachloride, ethylene dichloride and the like.

Another class of solvent which may be employed are the cyclic terpenes. The term "cyclic terpene" as used herein means the monocyclic and dicyclic hydrocarbons corresponding to the formula $C_{10}H_{16}$ and having two centers of reactivity, Such as d-limonene, dipentene, terpinolene, terpinene and the like. Alpha-pinene and Beta-pinene are dicyclic terpenes containing one double bond plus an additional center of reactivity at one of their tertiary carbon atoms (which is very prone to form a carbonium ion under conditions of acid catalysis). All of the cyclic terpenes are useful solvents in the method of the invention, but the dipentenes are particularly useful. The cyclic terpenes are not, of course, inert solvents but will in fact homopolymerize and also copolymerize to a small degree with the rosin components. This small amount of copolymerization is not disadvantageous for many uses of the product polymerizate. The reaction product obtained by polymerizing a solution of tall oil rosin in cyclic terpene solvent exhibits a very high degree of crystallization resistance, pale color and improved odor.

The proportion of solvent employed in the method of the invention is not critical and any proportion may be used which will facilitate the desired reaction. There are some advantages to diluting the reaction mixture with a volatile solvent either just before or just after neutralization. In this way, a wider variety of filtration equipment can be used, very fast filtration rates can be achieved and the solvent may be recovered for re-use.

In the method of the invention, bleaching clays and and filter aids may be added to the reaction mixture for improved product color.

The rosin may be polymerized according to the method of the invention, employing conventional reaction apparatus and means for admixing in the catalyst so that a homogeneous dispersion of catalyst in the rosin is obtained. During polymerization, a slight exotherm may be noted and conventional cooling means may be used, when desired, to maintain a constant temperature of the reaction mixture.

The course of the polymerization may be followed using conventional analytical techniques to determine the degree of polymerization. In general, the polymerization reaction is complete within from 1 to 24 hours, the shorter time providing only a modest resistance to crystallization while the longer tome provides a slightly higher softening point product with darker color.

Upon completion of the polymerization reaction, the catalyst may be inactivated by neutralization such as by adding an alkali, for example, lime, sodium carbonate and the like. Solvent, when present, may be removed by distillation, leaving the desired rosin with neutralized catalyst. For some uses of rosin, the level of polymerizing catalysts is so low and salts of the active acids are invisible in the rosin and have such a low order of toxicity that the neutral salts may remain in the product. When desired however the neutral salts may be filtered out. Alternatively, the catalyst may be washed out of the reaction mixture (which includes a solvent) with water washes.

I have described above the process conditions which are preferred and disclosed its essential features. From this it can be seen that the method of the invention offers many advantages over the previous art. This process is far less corrosive to stainless steel than those processes using strong acids and salts such as boron trifluoride, hydrochloric acid, zinc chloride, aluminum chloride and similar catalysts. Many of these prior art catalysts are known to cause stress crack corrosion in stainless steel. The catalyst used in the method of the present invention may be used under the conditions described, in much smaller amounts than most of the acids and acidic salts used in the prior art. They are less prone to cause rosin to decarboxylate and separate out sludge. The process of this invention is also notable in that it is conducted at a relatively high temperature (which facilitates rapid removal of exothermic heat and fast reaction times). It also obviates a need for the use of a processing solvent which is almost invariably used in the present state of the art and results in low kettle yield compared to the improved process of the invention. Other important advantages will be apparent to one skilled in the art.

The following Examples describe the manner and the process of making and using the invention and set forth the best mode contemplated by the inventor of carrying out the invention but are not to be considered as limiting. The methods of determining the resistance of the polymerized rosin to crystallization are as follows:

(a) IN ACETONE

Ten grains of pea-sized, dust-free lumps of the polymerized rosin are placed in a test tube measuring 20 mm×150 mm. Ten ml of reagent grade acetone is poured onto the rosin and a stop watch is started simultaneously. The lumps are observed until the first star of crystallizing rosin appears at which point the elapsed time is recorded.

(b) IN HEPTANE

Two hundred and forty grams of rosin lumps are placed in a one pint glass jar and 50 grams of heptane is poured over them. The jar lid is tightly secured and the jar is placed on a laboratory horizontal jar mill rolling bar which rolls at about 100 RPM. The elapsed time is noted when the rosin solution formed in the jar develops a cloud. Typical elapsed time for tall oil rosin in this test is zero. It develops a cloud due to crystallization immediately when the heptane is poured on it. North American domestic gum rosin exceeds 96 hours in this test and is given a value of 96+.

Dimer acid content is determined by gel permeation chromatography using tetrahydrofuran solvent through Microstyragel supplied by Waters Associals Inc.

All parts are by weight unless otherwise indicated.

EXAMPLE 1

With mixing, 0.5 parts of methanesulphonic acid is added to 100 parts of molten tall oil rosin (Unitol NCY, Union Camp Corp.) under nitrogen at a temperature of 150° C. The mixture is agitated for 16 hours at that temperature and then poured into pans (without removal of dissolved catalyst) and allowed to cool to room temperature.

A portion of the rosin product is dissolved to 70% nonvolatile solids content in a mixed solvent consisting of 75% xylene and 25% mineral spirits for viscosity determination. It had the following properties compared to the starting rosin.

|  | Starting Rosin | Polymerized Rosin |
|---|---|---|
| Acid number | 166 | 158 |
| Ring & ball softening point | 77° C. | 84° C. |
| Color (rosin cube) | WG | K-I |
| Viscosity in the mixed solvent | crystallized | 240 cps |
| Crystallization resistance in acetone |  |  |
| Elapsed time until crystals appear | 5 minutes | 7 hours |

EXAMPLE 2

The following materials are provided:

| tall oil rosin (Unitol NCY, supra.) | 100.0 pts |
|---|---|
| mineral spirits (Ashland Rule 66) | 11.1 |
| methanesulphonic acid (anhydrous) | 0.5 |
| sodium carbonate | 0.3 |

The mineral spirits are added to the molten rosin and the temperature of the mixture adjusted to 150° C. All the methanesulphonic acid is added with mixing. A sample is taken for analysis and thinned with one part xylene to 3.5 parts sample. The remaining reaction mixture is maintained at a temperature of 150° C. under nitrogen gas for 48 hours after which time a second sample is taken and thinned with xylene as described above. Sodium carbonate is then added to the remaining reaction mixture to neutralize the catalyst, and the mixture is filtered and steam stripped for one hour at 230° C. The following describes the product polymerized tall oil rosin;

| Initial viscosity from sample 1 | 90 cps |
|---|---|
| Final viscosity from sample 2 | 285 cps |
| Ring & ball softening point | 85° C. |
| Color (rosin cube) | F |
| Acid number | 130 |
| Crystallization from acetone | none in 96 hrs. |

EXAMPLE 3

The following materials are provided:

| Unitol NCY (supra) | 100 g |
|---|---|
| mineral spirits (Ashland Rule 66) | 25 g |
| Fluorade FC-24[1] |  |
| sodium carbonate | 0.5 g |

[1]Anhydrous trifluoromethanesulfonic acid supplied by 3M Company, Commercial Chemicals Division.

The mineral spirits is charged to the molten rosin (at 150° C.). Then the mixture is cooled to 100° C. and the Fluorade FC-24 added. The mixture is agitated at a temperature of 97° C. to 110° C. for twenty hours, then neutralized by the addition of the soda ash. The batch is then filtered molten to remove catalyst salt, and steam stripped for one hour at 230° C. to remove the solvent. The product had the following properties:

| | |
|---|---|
| Ring & ball softening point | 113° C. |
| Acid number | 142 |
| Color (rosin cube) | 1 |
| Dimerized rosin content | 44% |

EXAMPLE 4

The following materials are provided:

| | |
|---|---|
| Unitol NCY tall oil rosin (supra) | 100 parts |
| mineral spirits (Ashland Rule 66) | 25 |
| trichloromethanesulphonic acid | 1 |
| sodium carbonate | 0.5 |

The same procedure is used as described in Example 3 supra., except that the reaction mixture is maintained at 150° C. for two hours then retained at 125° C. for 16 hours rather than twenty hours. It is neutralized with sodium carbonate, filtered and steam stripped at 230° C. to a softening point of 80° C. The resulting polymerized rosin did not exhibit any signs of crystallization after 24 hours in the acetone test.

EXAMPLE 5

The following materials are provided:

| | Parts By Weight |
|---|---|
| Unitol NCY, (supra) | 696.0 |
| mineral spirits | 299.5 |
| 60% trifluoromethanesulfonic acid in water | 3.5 |
| sodium carbonate | 2.0 |
| | 1000.0 |

The molten rosin is charged to a kettle under nitrogen gas followed by the mineral spirits. Then the temperature of the mixture is adjusted to 110° C. and all the trifluoromethanesulfonic acid solution added. The temperature is maintained at 110° C. until the viscosity stops rising (which requires about 5 hours). After another hour all the $Na_2CO_3$ is added in 5 increments over a period of 15 minutes. The mixture is filtered hot and recharged to the kettle for stripping of solvent by heating up to 235° C. while collecting mineral spirits for recycle and maintaining inert gas flow. At 235° C., the $N_2$ is shut off and steaming begun. Steam to 104° C. gives minimum softening point (after about ½ hour), then a nitrogen gas purge is carried out and the mixture cooled to 140° C. for discharge. The polymer is characterized by:

| | |
|---|---|
| Ring & ball softening point | 105 |
| Color (rosin cube) | M |
| Acid number | 125 |

This is an example using water diluted catalyst.

EXAMPLE 6

The following materials are provided:

| | |
|---|---|
| Unitol NCY tall oil rosin (supra) | 1000 g |
| d-limonene (commercially distilled) | 250 g |
| methanesulphonic acid - anhydrous (MSA) | 5 g |

The d-limonene is mixed in the molten rosin, and the mixture adjusted to a temperature 150° C. All the MSA is added and the mixture held for 16 hours at 140° C., then under reduced pressure (5 mm Hg in 30 minutes), heated to 200° C. and held for an additional half hour when the vacuum is released with nitrogen gas. Upon cooling the hard rosin product (993 gm yield) obtained exhibited the following properties:

| | |
|---|---|
| Color (rosin cube) | N |
| Acid number | 139 |
| Softening point, (Ring & Ball) | 87° C. |
| Odor | slight fragrance |
| Crystallization Test | |
| Acetone | no crystals in 96 hours |
| Heptane | clear after 96 hours |

EXAMPLE 7

The following materials are provided:

| | |
|---|---|
| Unitol NCY tall oil rosin (supra) | 1000 g |
| Unitene D* (solvent) | 250 g |
| methanesulphonic acid (MSA) | 5 g |
| sodium carbonate | 3 g |

*Unitene D is the tradename for commercial dipentene; Union Camp Corporation, Wayne, New Jersey.

The Unitene D is mixed with the molten rosin, and the temperature of the mixture adjusted to 150° C. With stirring the MSA is added. The mixture is held at 150° C. for seven hours, then the soda ash is added and the mixture agitated for one hour, followed by molten filtration. Steam stripping the molten solution for half hour at a temperature 220° C. and cooled to 150° C., the rosin (1104 g) obtained exhibited the following properties:

| | |
|---|---|
| Color (rosin cube) | N |
| Acid number | 138 |
| Softening point, ring & ball | 80° C. |
| Crystallization test | |
| Acetone (as per Example 1) | no crystals in 96 hrs. |
| Heptane (as per Example 1) | clear after 96 hrs. |
| Odor | slight fragrance |

EXAMPLE 8

The following materials are provided:

| | |
|---|---|
| Unitol NCY tall oil rosin (supra) | 1000 g |
| mineral spirits (Ashland Rule 66; supra.) | 125 g |
| Unitene D (supra) | 125 g |
| methanesulphonic acid - anhydrous (MSA) | 5 g |
| sodium carbonate | 3 g |

The mineral spirits and Unitene D are added to the molten rosin under nitrogen gas and the temperature of the mixture adjusted to 150° C. while maintaining good agitation. All of the MSA is added and a temperature of 150° C.±3° C. is maintained for seven hours at which time the sodium carbonate is added to neutralize the catalyst. The mixture is filtered to remove MSA salts and steam stripped at a temperature of 230° C. until a Ring & Ball softening point of 80° C. is obtained. It was then purged with inert gas and poured into pans to cool. The following describes the product (1076 g yield) polymerized rosin.

| | |
|---|---|
| Final ring & ball softening point | 82° C. |
| Color (rosin cube) | M |
| Crystallization resistance | |
| Acetone | 96 hours + |
| Rosin odor | mild - pleasant |

This example illustrates the use of a mixture of an aliphatic hydrocarbon solvent and a commercial terpene solvent where the latter solvent contains not less than 50 percent of a cyclic terpene (dipentene).

EXAMPLE 9

The following are provided:

| | |
|---|---|
| Unitol NCY tall oil rosin (supra) | 1000 g |
| a-pinene (solvent) | 111 g |
| methanesulphonic acid (anhydrous) | 10 g |
| sodium carbonate | 6 g |

The above are combined following the procedure of Example 7 supra., except that the reaction mixture is maintained at 150° C. for 16 hours before addition of the soda ash. The following characterize the product (1030 g yield) of polymerized rosin.

| | |
|---|---|
| Acid number | 126 |
| Softening point | 88° C. |
| Color (rosin cube) | K to H |
| Crystallization test | |
| in acetone | over 96 hours |
| Rosin odor | mild - pleasant |

EXAMPLE 10

The following are provided:

| | |
|---|---|
| Unitol NCY tall oil rosin (supra) | 1000 g |
| terpinolene | 111 g |
| methanesulphonic acid (anhydrous) | 10 g |
| sodium carbonate | 6 g |

The same reaction conditions as used in Example 9, supra., are used to obtain a polymerized rosin (1040 g yield) characterized by:

| | |
|---|---|
| Acid number | 132 |
| Softening point, ring & ball | 87° C. |
| Color (rosin cube) | K to H |
| Crystallization test | |
| in acetone | over 96 hours |

EXAMPLES 11-16

In Examples 11-16 the procedure of Example 8, supra., is repeated except that the reaction mixtures were held at a temperature of 150° C. for 16 hours before the soda ash is added.

In each of the Examples, various rosins, solvents and catalysts were employed. The rosins, solvents, catalysts and resulting products (characterized by crystallization and odor characteristics) are shown in the table below.

| EXAMPLES 11-16 | | | | | | |
|---|---|---|---|---|---|---|
| | 11 | 12 | 13 | 14 | 15 | 16 |
| Nelio gum rosin | — | — | — | — | 1000 | — |
| wood rosin | — | — | — | — | — | 1000 |
| Unitol NCY | 1000 | 1000 | 1000 | 1000 | — | — |
| gum spirits of turpentine | 110 | — | — | — | — | — |
| b-pinene | — | 110 | — | — | — | — |
| Unitene D | — | — | 110 | 110 | 110 | 110 |
| methanesulphonic acid (anhydrous) | 10 | 10 | — | — | 5 | 5 |
| trifluoromethanesulphonic acid | — | — | 5 | — | — | — |
| trichloromethanesulphonic acid | — | — | — | 10 | — | — |
| mineral spirits | 110 | 110 | 110 | 110 | — | — |
| Crystallization from Acetone | over 24 hrs | over 24 hrs | over 24 hrs | over 24 hrs | over 24 hrs | over 24 hrs |
| odor of final rosin | pleasant | pleasant | pleasant | pleasant | pleasant | pleasant |

EXAMPLE 17

The following are provided to prepare esters A and B.

| | A | B |
|---|---|---|
| Unitol NCY tall oil rosin (supra) | 1000 | — Parts |
| polymerized rosin of Example 7, supra. | — | 1000 |
| glycerol (99%) | 120 | 120 |
| butylated hydroxytoluene (BHT) | 2 | 2 |

The glycerol is added to molten rosin under nitrogen gas in a four-neck, round bottom flask equipped with stirrer, agitator, thermometer and a direct take-off adapter leading to a down draining condenser. The temperature of the mixture is raised steadily and at an equal rate in both reactions A+B over a period of two hours until a top temperature of 285° C. is reached. This temperature is maintained for an additional five hours at which time the mixtures are cooled to 220° C., steam sparged for half an hour, then dried under a vigorous flow of nitrogen while cooling to 150° C. at which time, the BHT is added and they are poured into pans to cool. The products are characterized as follows:

| | A | B |
|---|---|---|
| Final acid number | 10 | 8 |
| Color (rosin cube) | N | M-N |
| Softening point, ring & ball | 97° C. | 90° C. |
| Oxygen absorption* | 3.5% | 0.7% |
| Viscosity increase in hot melt | | |

| | A | B |
|---|---|---|
| adhesive** | 30% | 15% |

*Weight increase in an oxygen atmosphere of 200 lbs/m² of an 0.5 g pulverized sample at room temperature in seven days.
**Change in viscosity as measured at 350° F. of a mixture of 40% rosin ester and 20% paraffin wax retained for 96 hours at 350° F.

This Example 17 illustrates that the polymerized rosin requires less glycerol for esterification. It produces a higher melting ester and the resulting ester is less subject to degradation due to oxidation than standard tall oil rosin ester. This ester also exhibits better viscosity stability in a standard ethylene-vinyl acetate hot melt adhesive.

EXAMPLE 18

Two natural rubber preparations (A and B) are prepared by combining the following ingredients:

| | A | B |
|---|---|---|
| american domestic gum rosin | 10 | — Parts |
| treated tall oil rosin of Example 7, supra. | — | 10 |
| milled natural rubber | 10 | 10 |
| toluene | 80 | 80 |

Two mil wet films of the above compositions are cast on 4 inch×9 inch glass panel with a Baker film castor. Dry films are tested by finger tack until the panel cannot be lifted by adhesion. The test results show:

| | A | B |
|---|---|---|
| Finger tack retention (days) | 4 | 14 |

The Example 18 illustrates that the polymerized rosin tackifies natural rubber and this tack is retained much longer than is typical for gum rosin.

I claim:

1. The method of polymerizing a rosin which comprises heating said resin in the presence of a catalytic proportion of a compound selected from those of the formula:

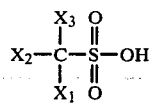

wherein $X_1$, $X_2$ and $X_3$ are each selected from the group consisting of hydrogen and halogen, and at a temperature of from about 60° C. to about 180° C.

2. The method of claim 1 wherein the rosin is selected from the group consisting of tall oil rosin, wood rosin and gum rosin.

3. The method of claim 2 wherein the rosin is tall oil rosin.

4. The method of claim 2 wherein the rosin is wood rosin.

5. The method of claim 2 wherein the rosin is gum rosin.

6. The method of claim 1 wherein the catalytic proportion is from about 0.01 to about 10 percent by weight of the rosin.

7. The method of claim 6 wherein the proportion is from about 0.3 to 1 percent.

8. The method of claim 1 wherein said compound is methanesulfonic acid.

9. The method of claim 1 wherein said compound is trichloromethanesulfonic acid.

10. The method of claim 1 wherein the compound is trifluoromethanesulfonic acid.

11. The method of claim 1 wherein the polymerization is carried out in an inert solvent.

12. The method of claim 1 carried out in a cyclic terpene solvent.

13. A method for decreasing the crystallizing tendency of tall oil rosin, comprising the polymerization of said rosin in the presence of methanesulfonic acid or its halogenated derivatives, in the temperature range of 80° to 190° C.

* * * * *